3,761,304
TREATMENT OF LEATHER
Alphonse Hansson, 13 Rue du Centre,
Hennuyeres, Belgium
No Drawing. Filed Sept. 17, 1971, Ser. No. 181,583
Int. Cl. B44d 1/32; C14c 9/00
U.S. Cl. 117—76 R            17 Claims

ABSTRACT OF THE DISCLOSURE

Process for the treatment of natural leather and synthetic leather by the joint application thereon of at least one layer of an aqueous dispersion of polyurethane and at least one layer of polyurethane dissolved in at least one organic solvent.

---

The present invention is concerned with a process for the treatment of natural leather, which may be buffed, and of synthetic leather with the help of polyurethanes, with a view to giving them improved properties.

By "natural leather" is to be understood all the materials manufactured from all kinds of animal skin by treatment with tanning matter, whereas by "synthetic leather" is to be understood the products that have the appearance of natural leather, that possess most of its properties and that can replace it in its uses, but which are manufactured from all sorts of synthetic materials, such as polyamides, polyesters, polyurethanes, and the like.

At present, many attempts aim at using polyurethanes for finishing leathers in order to impart to them properties of resistance to bending, abrasion, greasy and wet soiling and solvents, as well as eliminating partly or completely the need to clean them and feed them by polishing or any other treatment.

Another aim of specialists interested in the field of natural leather, is to give the external appearance of full grain leather to second quality leather, in particular the leather from old animals or from animals which had several litters or farrows, or the leather of which had been damaged by accidental injuries on which scars may or may not have formed.

A third aim, pursued by specialists both in natural and in synthetic leathers, is to finish such substrata by a finishing which permits the heat welding of the material, embossing or the making of drawings, without requiring any stitching.

Unexpectedly, we have found that the entirety of these aims could be achieved by a simple process, which comprises applying on natural and synthetic leather at least one layer of an aqueous dispersion of polyurethane and at least one layer of polyurethane dissolved in at least one organic solvent. The preparation of the aqueous dispersion of polyurethane used in the present invention is described in our copending application Ser. No. 181,582, filed Sept. 17, 1971.

The polyurethanes present in the aqueous dispersions and in the organic solutions and used in accordance with the present invention are linear or slightly branched thermoplastic polyurethanes, containing less than 0.2% of free isocyanate groups. They can be obtained, for example, by reacting diisocyanates with long-chain diols, such as polyester-glycols, polyether-glycols or polyolefin-glycols, if desired with an extension of the polymer chain by the use of chain-extension agents, such as diamines, glycols, amino-alcohols or the like.

When using a chain-extension agent, the synthesis may be carried out by introducing simultaneously into the reaction, the long-chain diol and the chain-extension agent according to the well-known "one shot" technique, or by synthesizing a prepolymer from a diisocyanate and a long-chain diol and subsequently extending the polymer chain by means of a chain-extension agent.

The polyurethane thus formed will be soluble in liquids which are known to be good solvents of polyurethanes, such as dimethyl formamide or dimethyl sulfoxide; it will, therefore, be preferably linear or very slightly branched depending upon whether the branching points are introduced by the three-fold functionality of one of the components participating in the reaction, or the branching is caused by the use of excess isocyanate which results in the formation of allophanate functions.

The polyether-glycols used for the synthesis of the polyurethanes may be poly(oxyalkylene)polyols, for example, poly(oxyethylene)glycol,
poly(oxypropylene)glycol,
poly(oxytetramethylene)glycol,
poly(oxyhexamethylene)glycol,
poly(oxyoctamethylene)glycol,
poly(oxynonamethylene)glycol,
poly(oxydecamethylene)glycol or
poly(oxydodecamethylene)glycol, or mixtures thereof; or polyethers obtained from a mixture of the oxides and the monomer diols containing 2 to 12 carbon atoms, as well as the polyacetals obtained from aldehyde and diols.

The polyether-glycols may also contain aromatic or alicyclic residues, obtained, for example, from the reaction of alkylene oxide with polyhydroxybenzenes, such as resorcinol, pyrogallol or the like.

Also included are the poly(oxyalkylene)polyols containing nitrogen bridges, for example, those obtained by the reaction of alkylene oxides with ammonia or aliphatic, aromatic or alicyclic polyamines. Similarly, the poly(oxyalkylene)polyols may contain sulfur bridges, for example, those obtained by the use of thioglycols.

The molecular weight of the polyetherglycol can be between 300 and 10,000 and is preferably between 600 and 4,000.

The polyesterglycols used for the preparation of polyurethanes in admixture with or instead of the above-described polyethers can be obtained, for example, by reacting aliphatic, alicyclic or aromatic di- or polycarboxylic acids or derivatives thereof, such as anhydrides, acid chlorides or esters, with polyols.

As examples of di- and polycarboxylic acids, there may be mentioned maleic, azelaic, itaconic, citraconic, succinic, adipic, suberic, sebacic, o-phthalic, isophthalic, terephthalic and hexahydroterephthalic acids, as well as the anhydrides and esters thereof and the halogenated and alkylated derivatives thereof, and the like. There may also be used hydroxy-acids, dimeric acids and lactones, such as hydroxy-stearic, ricinoleic and octadecadienoic acids; caprolactone and the like.

The polyols used in the preparation of these polyesters can be, for example, those used in the manufacture of poly(oxyalkylene)glycols described above.

The polyester-glycols used can also have a molecular weight between 300 and 10,000 and preferably between 600 and 4,000.

The polyolefin-glycols used in the present invention are linear polymers with terminal OH groups such as polybutadiene-diol obtained from olefins such as butadiene.

The polyolefin-glycols can also have a molecular weight between 300 and 10,000 and preferably between 600 and 4,000.

The chain-extension agents can be diols, such as butanediol, hexanediol, pentanediol, ethyleneglycol or the like, or diamines, such as ethylene-diamine, propylenediamine, butylene-diamine, pentylene-diamine, hexylene-diamine, naphthylene - diamine, isophorone - diamine, benzidine, toluidine or 4,4'-methylene-dianiline.

Examples of diisocyanates used in the preparation of the polyurethanes include tolylene diisocyanates, hexamethylene diisocyanate, tetramethylene diisocyanate, decamethylene diisocyanate, naphthalene diisocyanate, diphenylmethane diisocyanate, isophorone diisocyanate and the like and the alkyl- and halogen-substituted derivatives thereof.

The aqueous dispersions of polyurethanes can be obtained by a process in which there are dispersed in water, in the presence of a suitable amount of agents selected from the group consisting of surface-active agents and protective colloids, substantially inert polyurethanes which are dissolved in an organic medium having at ambient temperature (20° C.) a solubility in water of less than 25% by weight and preferably of less than 15% by weight.

The organic solutions of polyurethanes are formed from the polyurethanes described above, in solvents or mixtures of solvents making it possible to obtain, at ambient temperature, polyurethane solutions with a dry matter content between 2 and 60% and preferably between 5 and 40%. Examples of solvents which can be used include dimethyl formamide, dimethyl sulfoxide, tetrahydrofuran, cyclohexanone, toluene, xylene, isophorone, methyl ethyl ketone, methyl isobutyl ketone or the like, used alone or in the form of mixtures and possibly diluted with solvents such as xylene, toluene, hexane, heptane or the like.

We have observed, unexpectedly, that organic solutions of polyurethanes did not make it possible to achieve a proper finish or a good adherence on certain natural leathers, in particular on second quality leather, because of marked differences in the penetration of these solutions due to appreciable variations of porosity between the various parts of the skin originating from the back, belly, neck or the like.

On the other hand, the application of an aqueous dispersion of polyurethane during at least one of the initial stages of impregnation makes it possible to achieve a very high degree of regularity and plays the part of a surfacing agent such that subsequent treatment with polyurethane solutions no longer presents any appreciable difficulties.

In the process according to the invention, the polyurethane of the aqueous dispersion and the polyurethane of the organic solution are applied onto the leather in the proportion by weight of 5/95 to 60/40, preferably 10/90 to 40/60, calculated as dry matter. On the other hand, the total weight of polyurethane from the aqueous dispersion and from the organic solution applied onto the leather is 3 to 40 g. per square foot, preferably 5 to 25 g. per square foot; the amount depends on the kind of leather, its state of full grain or buffed, and the final effect pursued.

The products may be applied in known manner, for example, by means of a spray gun or by coating. If it is of importance, in the case of natural leather, to ensure the regularity of finishing by the application of the aqueous dispersion of polyurethane during one of the initial stages of finishing, the subsequent stages of finishing may immaterially be carried out with the aid of aqueous dispersions of polyurethanes or of organic solutions of those products, according to the finishing characteristics desired.

The dispersion may be pigmented by the dispersion of pigments or by the incorporation of water-soluble dyes. In this way, a very great evenness of colouring is ensured. The dyes and/or pigments may also be dissolved and/or dispersed in the organic solution of polyurethane.

The leather finished by this technique may, in addition, be varnished by standard methods, particularly by coating them with a polyurethane formed "in situ" by the reaction of a polyol with a polyisocyanate.

The process is suitably applied to leather of second quality which, previous to the treatment with the aqueous dispersions and the solutions of polyurethane, has undergone a scraping treatment intended to level the surface of the skin and to eliminate from it the irregularities arising from wrinkles, scars and other defects.

The application of the process according to the present invention makes it possible to give to these leathers a finish and a feel of a quality practically identical with those of full grain leather. This application of the process to buffed leathers also constitutes a feature of the present invention.

A third feature lies in the additional possibility of carrying out the practice of heat welding on leather finished according to the present invention. This constitutes an undisputed advantage, since it permits the elimination of sewing operations, which are an expensive item, especially when making shoes, wallets, armbands for watches, document-cases and the like, and also gives a longer life to the finished article.

The possibility of using thermoplastic polyurethanes in aqueous dispersion and in organic solution also makes it possible to achieve a set of properties unmatched by the other finishing techniques now used. As compared with a standard finish, the bending stress may be up to three times higher, the resistance to solvents is decidedly improved, resistance to water and to spotting is greater than that of a standard high quality finish, resistance to abrasion is also very considerably higher than with the present-day finishes, for example, those made with acrylic resins, this being demonstrated in the following examples.

The joint use of aqueous dispersions and of solutions of polyurethane pigmented or dyed according to the present invention, makes it possible to achieve a depth of penetration and an evenness of surfacing such that accidental surface scratches are far less visible than in the case of a standard finish.

Another feature of the present invention is that the application of the process to buffed leather, in addition to ensuring a finish with a value substantially equal to that attained on full grain leather, makes it possible to obtain leather, the apparent homogeneousness of which is improved, an effect which is called "substance."

Depending upon the intended use, the leather may be obtained with a matt, glossy or semi-glossy appearance and in the various bright or pastel shades.

As stated above, it is possible to varnish this leather, for example by using, after the standard finishing, a treatment with a two-component polyurethane system. The varnish thus obtained exhibits characteristics of resistance to bending, solvents and water, and of adherence which are considerably greater than those of the same varnish made on a leather finished according to traditional finishing techniques.

Another aspect of the invention is that, due to its resistance to solvents, water, various aqueous solutions and organic products, the leather treated according to the process of the present invention no longer requires the cleaning of shoes with polish and other leather preservation products.

It should be noted that the treatment in accordance with the present invention does not in any way affect permeability to air and water vapor of the lather treated, which thus enables it to "breathe" and avoid condensation and moistness, especially in the case of shoes.

Tests for the examination of leather (1) Bending-strength (Bally flexometer)

Samples of leather are taken along the different directions of the skin fibres and tested on the flexometer. Two stages of attack are noted: (a) small dots appear on the leather; (b) cracks develop, A note is taken of the number of bendings made when the first damage of each type occurs. A leather which has been given a good standard finish of the acrylic type, generally has a resistance of 15,000 to 20,000 bendings before the dots appear and 25,000 to 30,000 bendings before the cracks appear.

(2) Resistance to wet rubbing (Fek-Veslic apparatus)

A pad of boiled and then cooled felt (containing ±1 g. of water) is placed in the notch of the lever of the apparatus. On this lever, which performs the rubbing by an alternating movement, there is fixed a 1 kg. weight. The leather, clamped between the jaws of the apparatus, undergoes a 10% extension.

A certain number of alternating movements are performed. Any coming off or wrenching off is noted. A leather which has undergone a good standard finishing of the acrylic type generally goes through 20 to and fro movements before damage appears.

(3) Resistance to abrasion (Veslic apparatus)

Instead of a felt pad as hereinbefore, a rubber of suitable shape is placed in the notch of the lever. A 1.5 kg. weight is applied to the lever. The leather undergoes a 10% extension.

Leather which has been given a good finish of the acrylic type generally withstands 3 or 4 to and fro movements.

(4) Resistance to acetone (Veslic apparatus)

A dry felt is placed in the notch of the lever and another dry felt below the leather in a cavity of the plate over which the leather is drawn. The 1 kg. weight is removed from the lever, which corresponds to a residual weight of 0.5 kg. The leather undergoes a 5% extension. 1 cc. of acetone is placed in the cavity of the plate, containing a dry felt and, after a 50 second waiting period, a 10% extension is effected. The leather is then subjected to 5 alternating movements of the apparatus. Note is taken of the coming off or wrenching off. A good finish of the acrylic type makes it possible to reach a resistance of 2-3 passes.

(5) Resistance to immersion in water

The leather is immersed for 30 minutes in water at ambient temperature. An attempt is then made to pull off the finish. A good finished leather of the acrylic type withstands this test. However, a swelling of the film is observed quite frequently.

(6) Resistance to cold

The leather is placed for 30 minutes in a refrigerator, either at −10° C. or at −15° C. Note is taken of the resistance to simple folding and to double folding (development of cracks). A leather with a good finish of the acrylic type does not withstand the test made at −15° C. At −10° C., it withstands only the simple fold test but not the double fold test.

The following examples are given for the purpose of illustrating the present invention:

EXAMPLE 1

There is prepared a non-ionic aqueous dispersion (A) of polyurethane containing 17.5% of dry matter, starting from:

| | Parts |
|---|---|
| Polyurethane of intrinsic viscosity 0.9 dl./g., obtained by reacting poly(1,4-butanediol adipate) of molecular weight 1000, diphenylmethane-4,4'-diisocyanate and 1,4-butanediol | 45.1 |
| Isophorone | 180 |
| 4,4'-methylene-bis-(2,6-di-tert.-butyl-phenol) | 0.09 |
| Condensate of 25 moles ethylene oxide with a mixture of oleic and cetyl alcohols | 7.5 |
| Polyvinyl alcohol | 0.75 |
| Water | 66.75 |

In addition, there is prepared an organic solution (B) of the same polyurethane, starting from

| | Parts |
|---|---|
| Polyurethane | 5 |
| Dimethyl formamide | 72 |
| Toluene | 9 |
| Acetone | 9 |
| Titanium dioxide | 5 |

A previously scraped and buffed cow leather, 1.4 to 1.6 mm. thick, is treated by cross-gun-spraying with solution (B), depositing approximately 9 g. of solution per square foot of leather. Drying is carried out at 60° C. for 15 minutes. Spraying is then carried out with the use of a pigmented aqueous dispersion obtained by mixing

| | Parts |
|---|---|
| Dispersion (A) described above | 100 |
| Water | 75 |
| Dispersion of casein containing 15% dry matter | 20 |
| White pigment | 20 |

The deposition is thus made of about 4 g. per square foot of this aqueous dispersion. Drying is carried out at 60° C. for 15 minutes. Again, 4 g. of this dispersion is applied per square foot by spraying. Drying is carried out at 60° C. for 15 minutes and then pressure is exerted at 150 kg./cm.$^2$ at a temperature of 110° C. for 2 seconds.

The organic solution (B) is reapplied by gun-spraying, 8 g. per square foot being deposited. Drying is carried out at 60° C. for 15 minutes. Pressure is exerted for 2 seconds at 120° C. and 150 kg./cm.$^2$.

The leather thus obtained has the following characteristics:

bending strength: intact after 150,000 bendings
resistance to wet rubbing: intact after 150 passes
resistance to abrasion: about 5 passes
resistance to acetone: no pulling off or coming away but only a slight swelling after 4 passes
resistance to immersion in water: intact
resistance to cold: resists at −10° C. and at −15° C. both to simple and double folding.

A full grain appearance is restored to the leather, the shade of which is brighter than with standard finishes.

The leather obtained can be heat welded by high frequency welding.

EXAMPLE 2

The leather is treated in the manner described in Example 1 but it is then varnished by a two pot system by the application by gun-spraying of a mixture forming, on the leather, a polyurethane and constituted by a polyol (Bayer's Desmophen) and a polyisocyanate (Bayer's Desmodur L) of which about 8 g. is deposited per square foot. After drying the varnish, the properties are measured; they are equivalent to those of Example 1 except that the bending-strength is 108,000 bendings. Comparatively, the same two-pot varnish applied on an acrylic finish gives only a bending strength of 40,000 to 50,000 bendings.

The finished leather is heat-sealable by high frequency welding.

EXAMPLE 3

The non-ionic dispersion (A) of Example 1 is prepared. A non-ionic dispersion (C) is also prepared. It differs from dispersion (A):

(1) in that it is obtained by replacing the thermoplastic polyurethane of intrinsic viscosity 0.9 dl./g. by a polyurethane of the same chemical nature and prepared starting from the same constituents but possessing an intrinsic viscosity of 0.7 dl./g.;

(2) in that isophorone is replaced by a mixture of equal parts of isophorone and cyclohexanone.

The organic solution (B) of Example 1 is prepared but titanium dioxide is replaced by red iron oxide.

In addition, an organic solution (D) is prepared from:

| | Parts |
|---|---|
| Polyurethane | 8 |
| Dimethyl formamide | 65 |
| Toluene | 7.5 |
| Acetone | 7.5 |
| Red iron oxide | 12 |

A previously scraped and buffed goat leather, with a thickness of 1.1 to 1.3 mm., is treated by cross-gun-spraying with the solution (B), at an approximate rate of 8 g. per square foot. After drying, 5 g. per square foot of the dispersion (C) is applied by gun-spraying. After drying again, 4 g. per square foot of dispersion (A) are applied.

The leather is dried and pressed and then 9 g. of solution (D) are sprayed on with the gun.

A pressure of 150 kg./cm.$^2$ is applied for 2 seconds at 110° C., a leather being obtained, the characteristics of which are equivalent to those of the leather obtained in Example 1.

This leather has a resistance to acetone which is equal to that of the cow leather of Example 1, whereas a goat leather treated with an acrylic finish has a resistance to acetone which is definitely lower than a cow leather treated with the same acrylic finish.

This leather is heat-sealable.

EXAMPLE 4

Initially, 9 g. per square foot of the aqueous dispersion (C) is applied to a pig leather 1.2 mm. thick. After drying and pressing, the leather is treated with solution (D), 8 g. per square foot of which are deposited in two passes.

After drying and pressing, the leather obtained has characteristics equivalent to those of the leather obtained in Example 1.

EXAMPLE 5

The procedure is as in Example 3, the goat leather being replaced by a scraped and buffed cow leather, i.e. it is treated with 8 g./square foot of solution B, then with 5 g./square foot of dispersion C.

The leather obtained is then treated by a solution (E) obtained from:

| | Parts |
|---|---|
| Polyurethane of intrinsic viscosity 0.7 dl./g. (see Example 3) | 64 |
| Dimethyl formamide | 536 |
| Toluene | 150 |
| Aacetone | 150 |
| Methanol | 47 |
| Aniline red | 3 |

Approximately 8 g. per square foot of this solution is deposited. The leather is then dried and pressed for 2 seconds at 110° C. and 150 kg./cm.$^2$.

The leather obtained has characteristics equivalent to those of Example 1.

The aniline finish obtained has an even more marked full grain leather appearance.

EXAMPLE 6

A synthetic leather of non-woven tissue is used.

12 g. per square foot of the following emulsion (F) (dry matter content 14.35%) is first applied thereon by means of a curtain coating machine. The emulsion (F) is obtained from:

| | Parts |
|---|---|
| Polyurethane of intrinsic viscosity 0.7 dl./g. obtained by reacting poly(1,4-butanediol adipate) of molecular weight 1000, diphenylmethane-4,4'-diisocyanate and 1,4-butanediol | 60 |
| Isophorone | 180 |
| 4,4'-methylene-bis-(2,6-di-tert.-butyl-phenol) | 0.8 |
| Condensate of 25 mols ethylene oxide with a mixture of oleic and cetyl alcohols | 10 |
| 15% aqueous casein emulsion | 90 |
| Titanium dioxide | 60 |
| Water | 600 |

Drying is carried out at 60° C. for 20 minutes. Then about 9 g. per square foot of solution (B) described in Example 1 are applied by cross-gun-spraying. After drying at 60° C. for 15 minutes and pressing for 2 seconds at 85° C. and 150 kg./cm.$^2$, 5 g. per square foot of the following solution (G) are applied by cross-gun spraying. Solution (G) is obtained from:

| | Parts |
|---|---|
| Polyurethane described above for the preparation of emulsion (F) | 5 |
| Dimethyl formamide | 72 |
| Toluene | 9 |
| Acetone | 9 |

After drying at 60° C. for 25 minutes, the synthetic leather thus finished has the following characteristics:

bending strength: intact after 200,000 bendings
resistance to wet rubbing: intact after 500 passes
resistance to acetone: very well after 5 passes
resistance to cold: resists at −20° C. both to simple and double folding
resistance to abrasion and to immersion in water are also excellent.

EXAMPLE 7

A poromeric polyurethane synthetic leather (AKZO's Xylee) is used.

6 g. per square foot of solution (B) of Example 1 are applied by cross-gun-spraying. After drying at 60° C. for 2 minutes, 4 g. per square foot of emulsion (F) described in Example 6 are applied and drying is carried out at 60° C. for 25 minutes. 6 g. per square foot of solution (G) also described in Example 6 are then applied by cross-gun-spraying. After drying at 60° C. for 15 minutes and pressing for 2 seconds at 90° C. and 150 kg./cm.$^2$, the synthetic leather thus finished has characteristics similar to those of the leather obtained in Example 6. It is heat-sealable by standard techniques, in particular by high-frequency welding.

I claim:

1. A process of finishing natural or synthetic leather with polyurethanes, which comprises applying thereon at least one layer of an aqueous dispersion of an essentially linear thermoplastic polyurethane containing less than 0.2% of free isocyanate groups, and at least one layer of a solution in at least one organic solvent of an essentially linear thermoplastic polyurethane containing less than 0.2% of free isocyanate groups, and drying the leather after application of each of said layers.

2. Process according to claim 1 in which the aqueous dispersion of polyurethane is obtained by dispersing in water, in the presence of surface-active agents or protective colloids, substantially inert linear thermoplastic polyurethane containing less than 0.2% of free isocyanate groups dissolved in an organic medium having at ambient temperature a solubility in water of less than 25% by weight.

3. Process according to claim 1, in which the aqueous dispersion of polyurethane is obtained by dispersing in water, in the presence of surface-active agents or protective colloids, substantailly inert linear thermoplastic polyurethane containing less than 0.2% free isocyanate groups dissolved in an organic medium having at ambient temperature a solubility in water of less than 15% by weight.

4. Process according to claim 1, in which the solution of polyurethane is obtained by dissolving at ambient temperature 2 to 60% by weight of a substantially inert linear thermoplastic polyurethane containing less than 0.2% free isocyanate groups in at least one organic solvent.

5. Process according to claim 1, in which the solution of polyurethane is obtained by dissolving at a ambient temperature 5 to 40% by weight of a substantially inert linear thermoplastic polyurethane containing less than 0.2% free isocyanate groups in at least one organic solvent.

6. Process according to claim 1, in which the polyurethane of the aqueous dispersion and the polyurethane of the organic solution are applied on to the leather in the proportion by weight of 5/95 to 60/40, calculated as dry matter.

7. Process according to claim 1, in which the polyurethane of the aqueous dispersion and the polyurethane of the organic solution are applied on to the leather in the proportion by weight of 10/90 to 40/60, calculated as dry matter.

8. Process according to claim 1, in which the total weight of polyurethane from the aqueous dispersion and from the organic solution applied on to the leather is 3 to 40 g. per square foot.

9. Process according to claim 1, in which the total weight of polyurethane from the aqueous dispersion and from the organic solution applied on to the leather is 5 to 25 g. per square foot.

10. Process according to claim 1, in which the aqueous dispersion of polyurethane contains at least one member of the group consisting of dispersed pigments and water-soluble dyes.

11. Process according to claim 1, in which the solution of polyurethane in organic solvents contains at least one member of the group consisting of dispersed pigments and dyes soluble in organic solvents.

12. A process according to claim 1, in which after the application of both of said layers, there is applied to the leather thus coated at least one layer of finishing varnish.

13. A process according to claim 12, in which the finishing varnish is a two-component polyurethane varnish, the polyurethane of which is formed in situ on the leather from a mixture of a polyol and a polyisocyanate.

14. Process according to claim 1, in which the obtained leather is heat-sealable.

15. Process according to claim 1, in which the leather used is a natural buffed leather.

16. Heat-sealable natural leather having a polyurethane coating, obtained by the process according to claim 1.

17. Heat-sealable synthetic leather having a polyurethane coating, obtained by the process according to claim 1.

References Cited

UNITED STATES PATENTS

| | | | |
|---|---|---|---|
| 3,619,257 | 11/1971 | Fukada et al. | 117—62 X |
| 3,298,856 | 1/1967 | Harding | 117—76 |
| 2,879,178 | 3/1959 | McWherter et al. | 117—76 |
| 3,537,808 | 11/1970 | Gordon | 117—142 X |
| 3,493,426 | 2/1970 | Kamal | 117—142 |
| 3,119,716 | 1/1964 | Wooster | 117—76 |
| 3,687,715 | 8/1972 | Kigane et al. | 117—76 |
| 3,282,726 | 11/1966 | Seligsberger | 117—142 X |

FOREIGN PATENTS

| | | | |
|---|---|---|---|
| 1,128,568 | 9/1968 | Great Britain | 117—142 |

WILLIAM D. MARTIN, Primary Examiner

HARRY J. GWINNELL, Assistant Examiner

U.S. Cl. X.R.

117—65.2, 142, 161 KP, 104

UNITED STATES PATENT OFFICE
CERTIFICATE OF CORRECTION

Patent No. 3,761,304     Dated September 25, 1973

Inventor(s) Alphonse Hansson

It is certified that error appears in the above-identified patent and that said Letters Patent are hereby corrected as shown below:

In the heading to the printed specification after line 5, insert -- Claims priority, application Great Britain, Sept. 21, 1970, 4478/70 --.

Signed and sealed this 9th day of July 1974.

(SEAL)
Attest:

McCOY M. GIBSON, JR.          C. MARSHALL DANN
Attesting Officer             Commissioner of Patents